US012650902B2

(12) United States Patent
Karna et al.

(10) Patent No.: US 12,650,902 B2
(45) Date of Patent: Jun. 9, 2026

(54) REGISTER RETENTION DURING DEVICE POWER COLLAPSE

(71) Applicant: QUALCOMM Incorporated, San Diego, CA (US)

(72) Inventors: Vishal Karna, San Diego, CA (US); Rohit Chaudhary, San Diego, CA (US); Vijayaram Muppalla, San Diego, CA (US); Tanmay Ashokkumar Sharma, San Diego, CA (US); Yu-An Shih, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 85 days.

(21) Appl. No.: 18/761,558

(22) Filed: Jul. 2, 2024

(65) Prior Publication Data

US 2026/0010435 A1      Jan. 8, 2026

(51) Int. Cl.
*G06F 9/44* (2018.01)
*G06F 9/445* (2018.01)
*G06F 11/14* (2006.01)

(52) U.S. Cl.
CPC ...... *G06F 11/1441* (2013.01); *G06F 9/44505* (2013.01)

(58) Field of Classification Search
CPC .................................... G06F 1/32; G06F 9/44
See application file for complete search history.

(56) References Cited

U.S. PATENT DOCUMENTS

| | | | |
|---|---|---|---|
| 9,104,824 B1 * | 8/2015 | Loh ........................ | G06F 30/337 |
| 2019/0146710 A1 * | 5/2019 | Gschwind ........... | G06F 9/30043 |
| | | | 711/154 |
| 2025/0181734 A1 * | 6/2025 | Save ........................ | G06F 21/62 |

* cited by examiner

*Primary Examiner* — Keshab R Pandey
(74) *Attorney, Agent, or Firm* — Harrity & Harrity, LLP

(57)      ABSTRACT

Various aspects of the present disclosure generally relate to integrated circuits. In some aspects, a device may identify a register associated with the device. The device may identify, based at least in part on a formal based register retention analysis, that the register is to be retained during a power collapse associated with the device. The device may generate a register retention list that includes the register. The device may perform, after the power collapse, a hardware functional reset based at least in part on the register retention list. Numerous other aspects are described.

20 Claims, 7 Drawing Sheets

100 ➞

100

200

RTL Design

Initial register retention list (UPF)

Power Aware Functional Verification (Simulation)

Missing register retention?

Add missing register(s) to retention list

Yes

No

Final retention list (UPF)

300

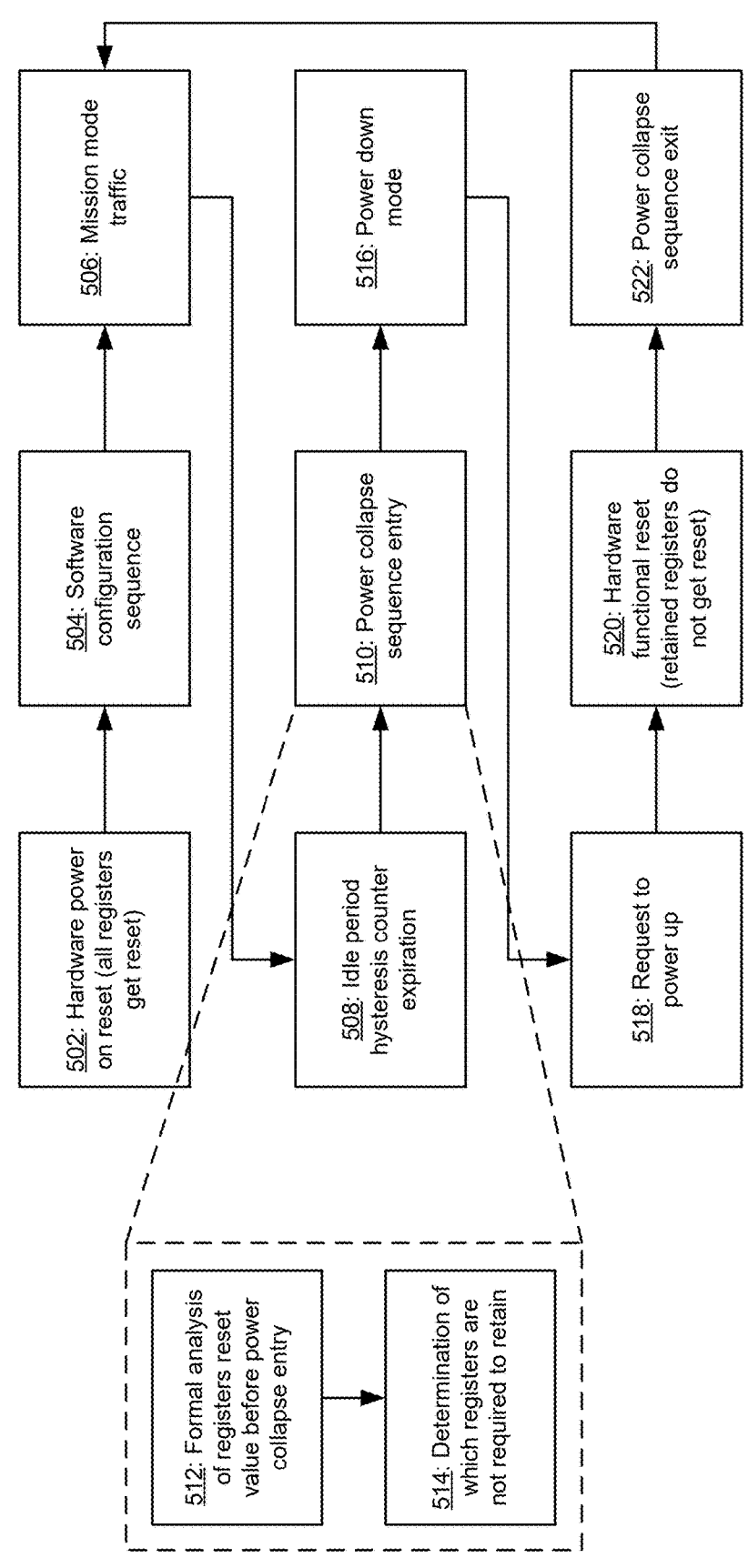

FIG. 5

502: Hardware power on reset (all registers get reset)

504: Software configuration sequence

506: Mission mode traffic

508: Idle period hysteresis counter expiration

510: Power collapse sequence entry

516: Power down mode

512: Formal analysis of registers reset value before power collapse entry

514: Determination of which registers are not required to retain

518: Request to power up

520: Hardware functional reset (retained registers do not get reset)

522: Power collapse sequence exit

500

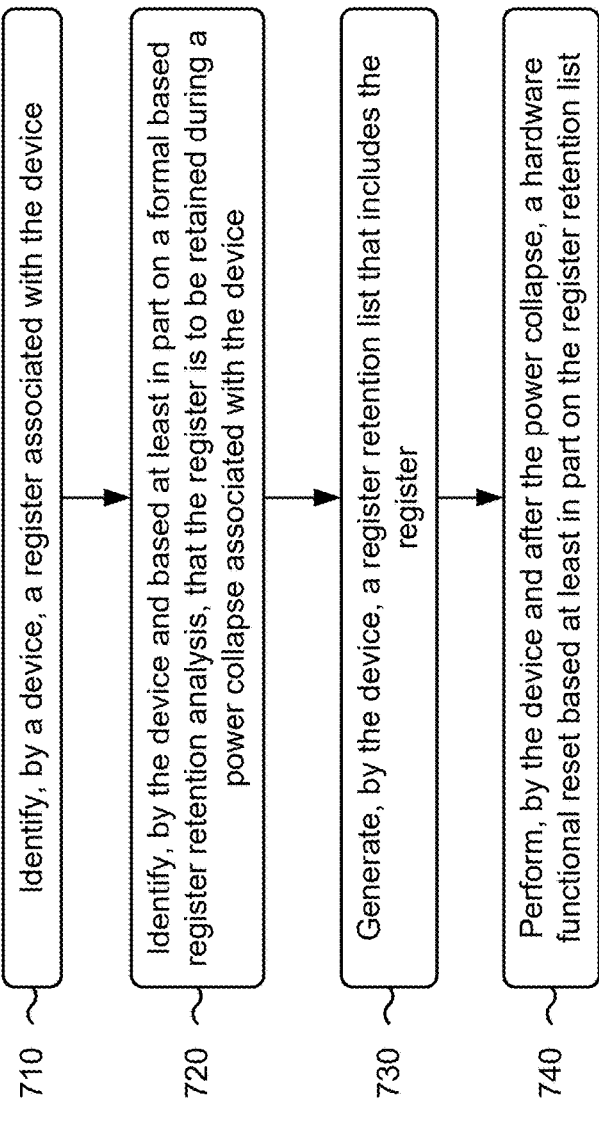

700

710 Identify, by a device, a register associated with the device

720 Identify, by the device and based at least in part on a formal based register retention analysis, that the register is to be retained during a power collapse associated with the device 730 Generate, by the device, a register retention list that includes the register 740 Perform, by the device and after the power collapse, a hardware functional reset based at least in part on the register retention list

FIG. 7

REGISTER RETENTION DURING DEVICE POWER COLLAPSE

FIELD OF THE DISCLOSURE

Aspects of the present disclosure generally relate to integrated circuits and, for example, to register retention during a device power collapse.

BACKGROUND

A system on a chip (SoC) is an integrated circuit that integrates a plurality of electronic components. The electronic components may include a processor, a memory, and/or a transceiver, which may all be integrated on a single piece of silicon. The SoC may contain digital signal processing functions. The SoC may be used for a mobile computing device, such as a smart phone or a tablet computer.

SUMMARY

In some implementations, a device includes one or more components configured to: identify a register associated with the device; identify, based at least in part on a formal based register retention analysis, that the register is to be retained during a power collapse associated with the device; generate a register retention list that includes the register; and perform, after the power collapse, a hardware functional reset based at least in part on the register retention list.

In some implementations, a method includes identifying, by a device, a register associated with the device; identifying, by the device and based at least in part on a formal based register retention analysis, that the register is to be retained during a power collapse associated with the device; generating, by the device, a register retention list that includes the register; and performing, by the device and after the power collapse, a hardware functional reset based at least in part on the register retention list.

In some implementations, a non-transitory computer-readable medium storing a set of instructions includes one or more instructions that, when executed by one or more processors of a device, cause the device to: identify a register associated with the device; identify, based at least in part on a formal based register retention analysis, that the register is to be retained during a power collapse associated with the device; generate a register retention list that includes the register; and perform, after the power collapse, a hardware functional reset based at least in part on the register retention list.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram of an example associated with a formal based register retention analysis, in accordance with the present disclosure.

FIG. 7 is a flowchart of an example process associated with register retention during a device power collapse, in accordance with the present disclosure.

DETAILED DESCRIPTION

Figure 1:
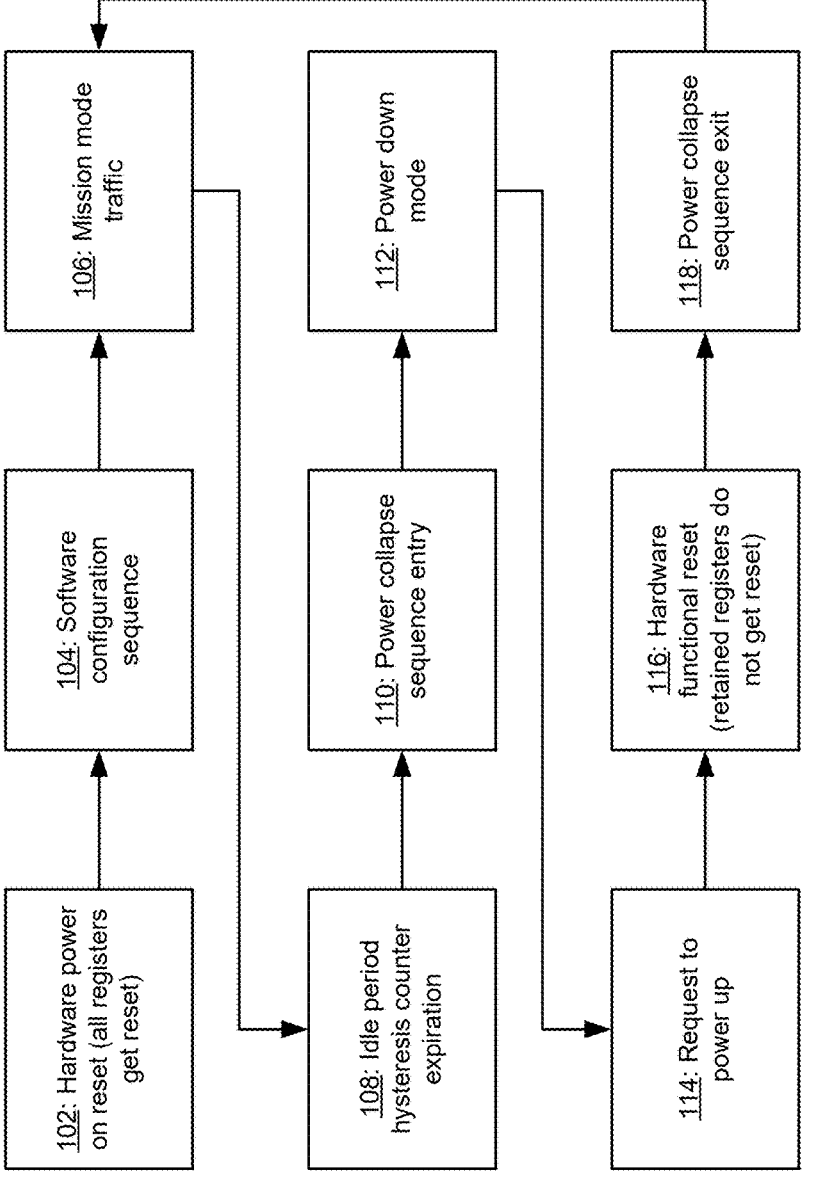
FIG. 1 is a diagram illustrating an example associated with a power collapse sequence of hardware, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Low power design techniques may be critical for battery powered devices, such as mobile phones. A device, when not used for a period of time, may enter a low power mode to save energy. The device may be running an application when the device enters the low power mode. When the device wakes up from the low power mode, an ability to quickly access the application may be desirable. In other words, after the device wakes up from the low power mode, waiting an additional period of time until the application is ready to be used may be undesirable from a user experience perspective. When a user clicks on the application, corresponding hardware serving that application should become active relatively quickly.

A hardware state before the device entered the low power mode may be retained, which may allow the hardware to become active relatively quickly. The hardware may include registers (or flipflops), which may store information that enables the hardware to function correctly when the hardware becomes active after a device wakeup. At least some registers may be retained when the device is in the low power mode, which may allow the hardware to quickly become active without software intervention (e.g., software intervention may increase an amount of time for the hardware to become active). In other words, the hardware state before a power collapse may be saved, so that when the device comes out of the power collapse, that hardware state may be quickly resumed. The power collapse may refer to a state in which certain functional blocks or components within an SoC are powered down or put into a low power mode to conserve power. However, specific registers that should be retained may be difficult to determine, so as a default, a majority of registers may be retained during the low power mode. A confirmation of which registers are needed to be retained and which registers are allowed to not be retained may be difficult to achieve, so the majority of registers may be retained by default. When a register that should be retained is not actually retained, the device wakeup (or application wakeup) may experience an additional delay or not function properly. With full retention, all registers (or a majority of registers) may be retained, even though only a relatively small number of registers actually need to be retained, but finding those small number of registers may be difficult. The over-retention of registers may increase routing congestion and cause leakage power.

A system on a chip (SoC) in the device may deploy several techniques to minimize static and dynamic power (e.g., collapsible hardware with a relatively large number of retained registers). The register may also be referred to as the flipflop. During the low power mode, the device may retain a full set of configuration and state registers to maximize a device performance when the device exits the low power mode. Retaining the full set of configuration and state registers may not necessarily be required for correct functionality after the power collapse. Retaining the full set of configuration and state registers may consume a large area in the SoC, as each register is replaced by a special retention state register. Retention state registers may also require special retention voltage, which may introduce complications and penalties during routing, and may further increase the area of the SoC due to routing congestion.

Various aspects relate generally to integrated circuits. Some aspects more specifically relate to register retention during a device power collapse. In some examples, a device may identify a register associated with the device. The register may not be a control and status register (e.g., the register may be a non-CSR). The device may be an SoC. The register may be one of a plurality of registers associated with the device. The device may identify, based at least in part on a formal based register retention analysis, whether the register is to be retained during a power collapse associated with the device. "Formal based register retention analysis" may involve a formal verification, where the formal verification may be a process of proving or disproving a correctness of a design specification property using formal mathematical techniques, such as Boolean satisfiability problem solvers. Formal verification may also be referred to as an assertion based formal verification technique. By using the formal verification, different registers may be determined as being retained or not retained during the power collapse. The formal based register retention analysis may be different than a register retention analysis that is based at least in part on simulation. The formal based register retention analysis may be based at least in part on a register transfer level (RTL) design, initial design constraints, and/or a retention analysis property. The formal based register retention analysis may involve checking a given register, before a power collapse, to determine whether that register reaches a reset value without software intervention. Depending on whether that register reaches the reset value, the register may be retained or not retained during the power collapse. By using the formal based register retention analysis, the device may identify a first value associated with the register, where the first value may be associated with an initial hardware reset value of the register. The device may identify a second value associated with the register, where the second value may be associated with a value of the register immediately prior to the power collapse. The device may determine that the register is to not be retained based at least in part on the first value being the same as the second value, where the register may be excluded from a register retention list. Alternatively, the device may determine that the register is to be retained based at least in part on the first value being different from the second value, where the register may be included in the register retention list.

In some aspects, the device may identify a third value associated with the register, wherein the third value is associated with a value of the register upon a power collapse exit. The register may be associated with mission mode activity without a software configuration sequence based at least in part on the second value corresponding to the third value. The device may generate the register retention list that includes the register or does not include the register, depending on whether the register is to be retained. The register retention list based at least in part on the formal based register retention analysis may be a reduced register retention list, as compared to a register retention list that is derived using simulation as opposed to formal analysis. The device may perform, after the power collapse, a hardware functional reset based at least in part on the register retention list. For example, when the register is included in the register retention list, the register may not be reset during the hardware functional reset.

Particular aspects of the subject matter described in this disclosure can be implemented to realize one or more of the following potential advantages. In some examples, by employing the formal based register retention analysis, the described techniques can be used by the device to reduce a number of retention registers which are not required for correct functionality after a device power up. Reducing the number of registers that are not retained may directly impact a leakage power and area (e.g., may reduce leakage power and area). The device may identify a minimal set of registers that are required to be retained (e.g., a partial retention), which may incur area savings and die size reduction primarily due to the reduction in the number of retention cells and reduced routing congestion. The device may identify registers that are not required to be retained with lower cost and effort, as compared to traditional simulation-based techniques, which may lead to an efficiency improvement in a design and verification process and which may save resources at the SoC. The formal based register retention analysis may consume fewer resources as compared to the simulation-based techniques because the simulation-based approach may be practically infeasible due to various reasons. The various reasons may include all possible software and system use cases may need to be fully verified alongside functional and code overage closure, any misses in identifying the use cases may lead to an incomplete confirmation of the partial register retention list, and/or a relatively large number of power aware regression iterations may be required, which may be compute and time intensive. The device may identify a list of functional registers which are safe not to be retained using the register retention list. A reduction in the number of retention registers (or number of registers that are retained) may be applicable to hardware for mobile, compute, automotive, and/or artificial intelligence (AI) SoCs to reduce leakage power and area by reducing the number of retained registers. The hardware may be power collapsible and may deploy a register retention scheme.

FIG. 1 is a diagram of an example 100 associated with a power collapse sequence of hardware, in accordance with the present disclosure.

As shown by reference number 102, during a hardware power on reset, a plurality of registers (e.g., all registers) associated with the hardware may be reset to a reset value (e.g., 0 or 1). The hardware power on reset may occur when a chip associated with an SoC is booted up. As shown by reference number 104, a software configuration sequence may be initialized to configure the plurality of registers. As shown by reference number 106, after the plurality of registers are initialized, mission mode traffic may allow actual traffic to flow based at least in part on the plurality of registers. As shown by reference number 108, an idle period hysteresis counter expiration may occur, which may occur after no activity for a certain period of time (e.g., no activity on user side). The period of time may be software configurable. As shown by reference number 110, a power collapse sequence entry may occur, which may involve the hardware entering a power saving mode. During the power saving mode, clocks to the plurality of registers may be turned off, and a voltage supply may be disconnected. As shown by reference number 112, the hardware may be in a power down mode. As shown by reference number 114, a request to power up the hardware may be created, which may be in response to activity (e.g., a user clicks on an application) which necessitates that the hardware be functional. As shown by reference number 116, a hardware functional reset may occur, in which retained registers do not get reset. The hardware functional reset may only be for registers that were not retained because only those registers are collapsed. Retention registers may not be reset and remaining registers may be reset. The reset of registers may involve the registers being reset to the reset value, which may be based at least in part on a software intervention. Important registers may be retained to avoid this software intervention, but identifying which registers are important and should be retained, versus not retained, may be difficult, so a majority of registers may be retained which may reduce power savings. As shown by reference number 118, a power collapse sequence exit may occur, and mission mode traffic may again be allowed.

As indicated above, FIG. 1 is provided as an example. Other examples may differ from what is described with regard to FIG. 1.

Figure 2:
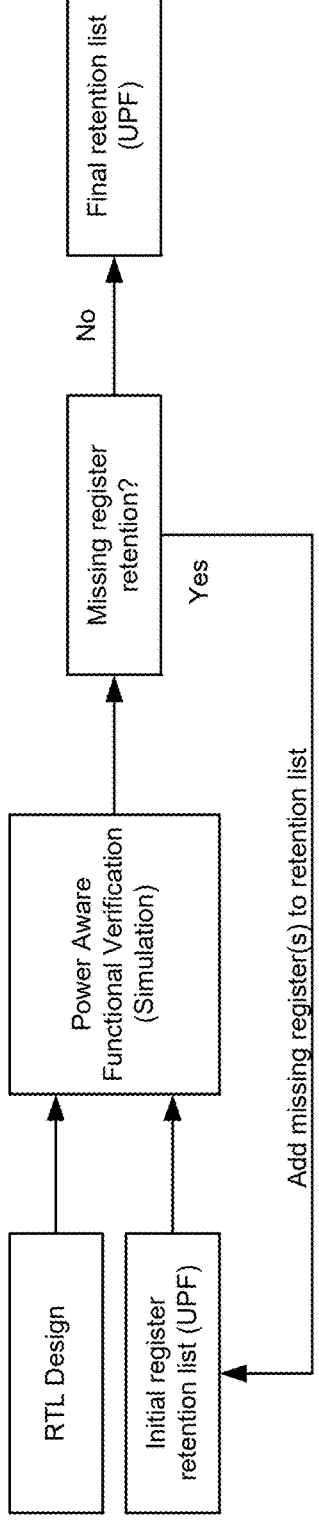
FIG. 2 is a diagram illustrating an example associated with verifying partial register retention lists using simulation, in accordance with the present disclosure.

FIG. 2 is a diagram of an example 200 associated with verifying partial register retention lists using simulation, in accordance with the present disclosure.

Power aware functional simulation techniques may be deployed to verify that a partial register retention list in a unified power format (UPF) is a complete set, which may ensure correct functionality of hardware after the hardware powers up (e.g., post power up). A simulation-based approach to verify a register retention list completeness may be non-trivial and time consuming. The simulation-based approach may be practically infeasible due to various reasons, such as all possible software and system use cases may need to be fully verified alongside functional and code overage closure, any misses in identifying the use cases may lead to an incomplete confirmation of the partial register retention list, and/or a relatively large number of power aware regression iterations may be required, which may be compute and time intensive. As a result, while a device may be able to determine minimum required partial state retention registers, this process is typically cumbersome and iterative, thereby wasting resources at the device.

As shown in FIG. 2, a power aware functional verification (simulation) may be based at least in part on an RTL design and an initial register retention list. The initial register retention list may be an initial list of identified registers that should be retained, and the initial list may be incomplete. A missing register retention may depend on the power aware functional verification. Depending on the power aware functional verification, one or more missing registers may be added to a retention list, or a final retention list in the UPF may be created. The power aware functional verification may be based at least in part on a significant number of use cases for each register, to ensure that a register retention list is complete, which may involve a significant workload.

As indicated above, FIG. 2 is provided as an example. Other examples may differ from what is described with regard to FIG. 2.

Figure 3:
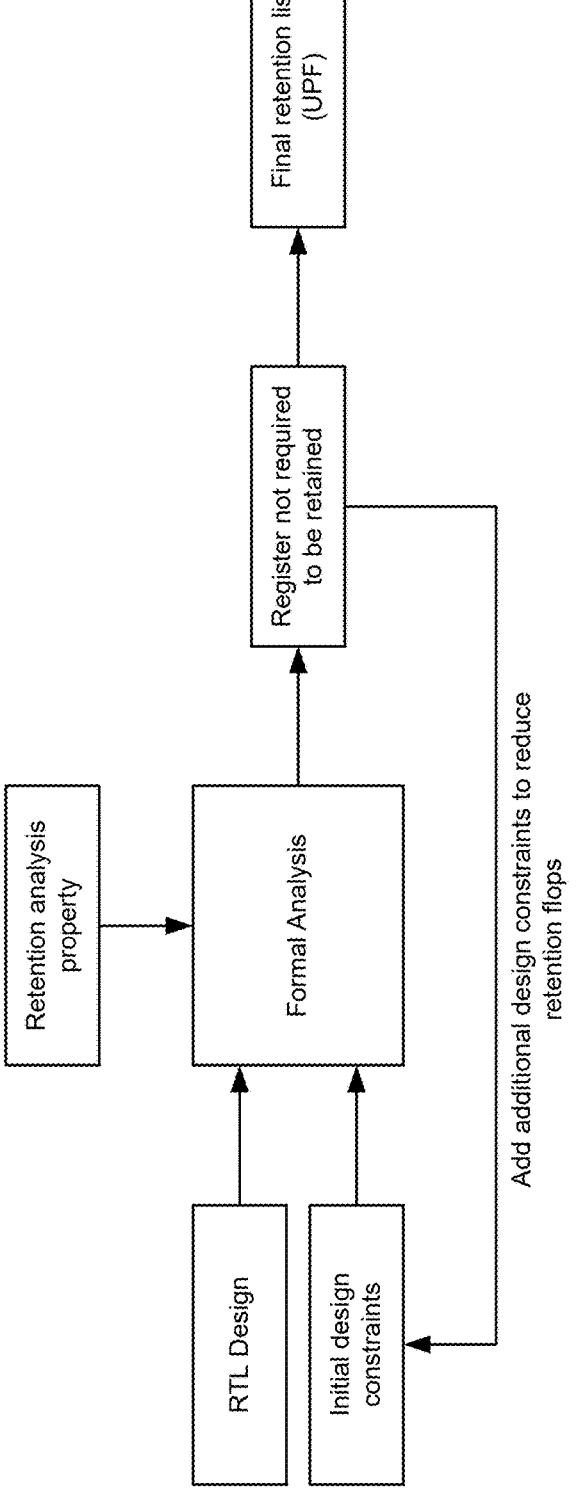
FIG. 3 is a diagram of an example associated with formal based register retention analysis, in accordance with the present disclosure.

FIG. 3 is a diagram of an example 300 associated with formal based register retention analysis, in accordance with the present disclosure.

As shown in FIG. 3, a formal analysis of register retention may be based at least in part on an RTL design, initial design constraints, and/or a retention analysis property. The formal analysis may produce an indication of a register that is not required to be retained, which may be used to create a final retention list. Additional design constraints may be added to reduce retention flops. Depending on the formal analysis, a plurality of registers, such as non-CSRs, may be checked before a power collapse in order to determine whether the registers reach a reset value without software intervention. A non-CSR may differ from a CSR, in that the CSR may be a register that is controlled by software, whereas the non-CSR may not be directly controlled by software. A register which comes back to its power on reset (POR) value by hardware design may not be required to be retained. In other words, for a register that already comes back to the POR value, retaining that register is not useful, because a functional reset of that register would also cause the register to come back to the POR value. Through formal analysis, a value of the register (e.g., a functional flipflop value) before a power collapse entry may be checked against its value after an initial reset, and when the values are the same, then the register may be excluded from a retention list. Before the power collapse, all registers that automatically, in the hardware, come to the reset may be marked as not retained, and those registers may not be included in the final retention list. A register that does not come back to its POR value by hardware design may be retained. In other words, through formal analysis, the value of the register before the power collapse entry may be checked against its value after the initial reset, and when the values are different, then the register may be included in the retention list. The formal analysis may allow a complexity of identifying registers that are not required to be retained through counter example to be trivial and time efficient, as the formal analysis does not require all use cases to be identified. The formal analysis may be deployed on power resource state control (PRSC) hardware for a premium tier mobile SoC to identify registers that are not required to be retained.

In some aspects, the initial design constraints may include clock and reset definitions. The initial design constraints may include optional CSR assumptions (e.g., a one-time setting). The initial design constraints may involve marking all CSRs with a fixed value. CSRs are typically not a high number of registers as compared to non-CSRs (e.g., functional flipflops). In some cases, all CSRs may be retained. Alternatively, CSRs that are retained may be a partial set of a full set of CSRs. In some aspects, the retention analysis property may allow the formal analysis to be scaled to a large number of registers (e.g., 24,000 registers or more) associated with the hardware.

In some aspects, in a formal approach, only the RTL design and the initial design constraints may be required. Formal tools may automatically identify all types of registers in design, and provide access to registers using a tool command language (TCL) application programming interface (API). Using a TCL interface, for each register, a property may be generated to check whether the register reaches a reset value just before the power collapse sequence entry. Any register that comes back to its POR value before power collapse may not be required to be retained. By using automation, formal results may be parsed to generate information in a user-friendly format. For example, register statistics per module within a design may include register names, hierarchy paths, and an indication of whether to retain or not retain.

In some aspects, a formal register retention analysis may be started with a minimal set of design constraints, which may allow for quicker convergence to identify a number of registers that are not required to be retained based at least in part on a reset value analysis. In a subsequent iteration of formal runs, more design constraints may be added, which may result in an additional set of registers that are not required to be retained. As more constraints are added, a probability of bounded proof results for a register property may be higher, which may be acceptable since each formal run may be trying to find additional sets of registers that are not required to be retained. A union of results generated from each formal run may provide the final list of registers not required to be retained based at least in part on the reset value analysis. In other words, as additional constraints are added, additional registers that are not required to be retained may be identified.

As indicated above, FIG. 3 is provided as an example. Other examples may differ from what is described with regard to FIG. 3.

Figure 4:
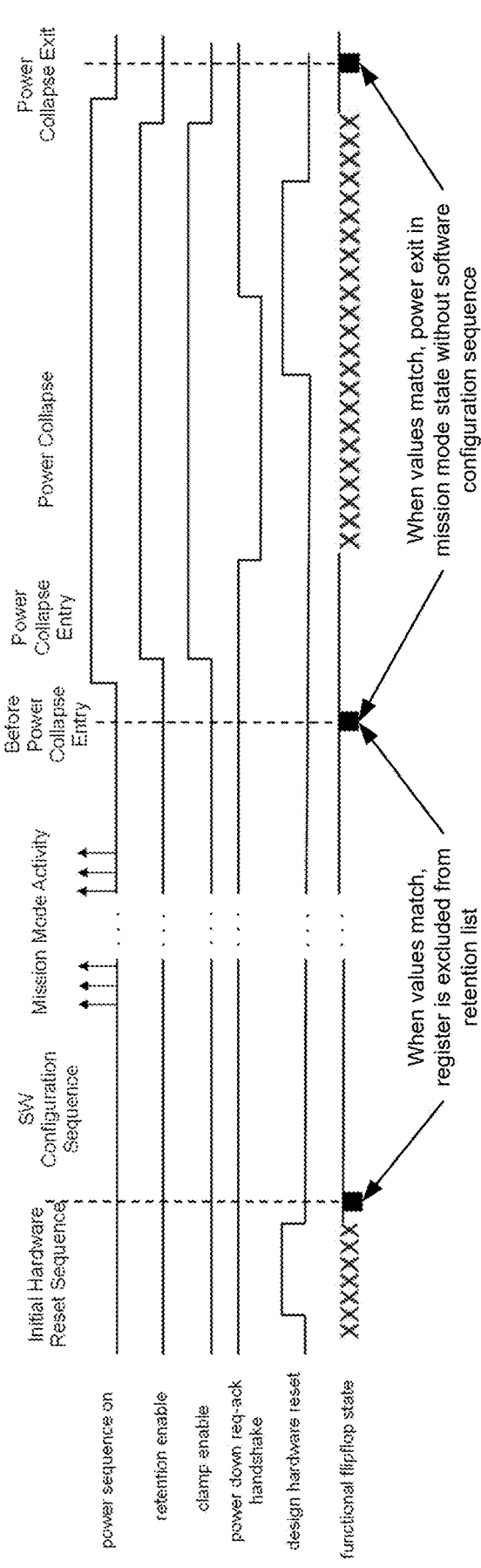
FIG. 4 is a diagram of an example associated with a timing diagram of a power collapse, in accordance with the present disclosure.

FIG. 4 is a diagram of an example 400 associated with a timing diagram of a power collapse, in accordance with the present disclosure.

As shown in FIG. 4, a power sequence on, a retention enable, a clamp enable, a power down request acknowledgement handshake, a design hardware reset, and a functional register state (functional flipflop state) may each be defined during an initial hardware reset sequence, a software con-figuration sequence, mission mode activity, before a power collapse entry, a power collapse entry, a power collapse, and a power collapse exit. Through formal analysis, a register value before the power collapse entry may be checked against a corresponding register value associated with the initial hardware reset sequence (e.g., a register value after an initial reset), and when the values are the same, then a corresponding register may be excluded from a retention list. In other words, the register may be not retained. When the values are not the same, then the corresponding register may be included in the retention list. In other words, the register may be retained. Through formal analysis, the register value before the power collapse entry may be checked against a corresponding register value associated with the power collapse exit, and when the values are the same, a power exit design may be in a mission mode state without a software configuration sequence. A formal tool may perform this formal analysis for each register of the hardware to determine whether each register should be retained or not retained.

As indicated above, FIG. 4 is provided as an example. Other examples may differ from what is described with regard to FIG. 4.

FIG. 5 is a diagram of an example 500 associated with a formal based register retention analysis, in accordance with the present disclosure.

As shown by reference number 502, during a hardware power on reset, a plurality of registers (e.g., all registers) associated with hardware may be reset to a reset value (e.g., 0 or 1). As shown by reference number 504, a software configuration sequence may be initialized to configure the plurality of registers. As shown by reference number 506, after the plurality of registers are initialized, mission mode traffic may allow actual traffic to flow based at least in part on the plurality of registers. As shown by reference number 508, an idle period hysteresis counter expiration may occur, which may occur after no activity for a certain period of time (e.g., no activity on user side). As shown by reference number 510, a power collapse sequence entry may occur, which may involve the hardware entering a power saving mode. As shown by reference number 512, a formal analysis of a register reset value before the power collapse sequence entry may be performed. As shown by reference number 514, when a register state is the same as a power on reset, such registers are not required to be retained to ensure functionality of the hardware post power collapse exit. In other words, such registers may not be retained or may be excluded from a register retention list. As shown by reference number 516, the hardware may be in a power down mode. As shown by reference number 518, a request to power up the hardware may be created, which may be in response to activity (e.g., a user clicks on an application) which necessitates that the hardware be functional. As shown by reference number 520, a hardware functional reset may occur, in which retained registers do not get reset. As shown by reference number 522, a power collapse sequence exit may occur, and mission mode traffic may again be allowed.

As indicated above, FIG. 5 is provided as an example. Other examples may differ from what is described with regard to FIG. 5.

Figure 6:
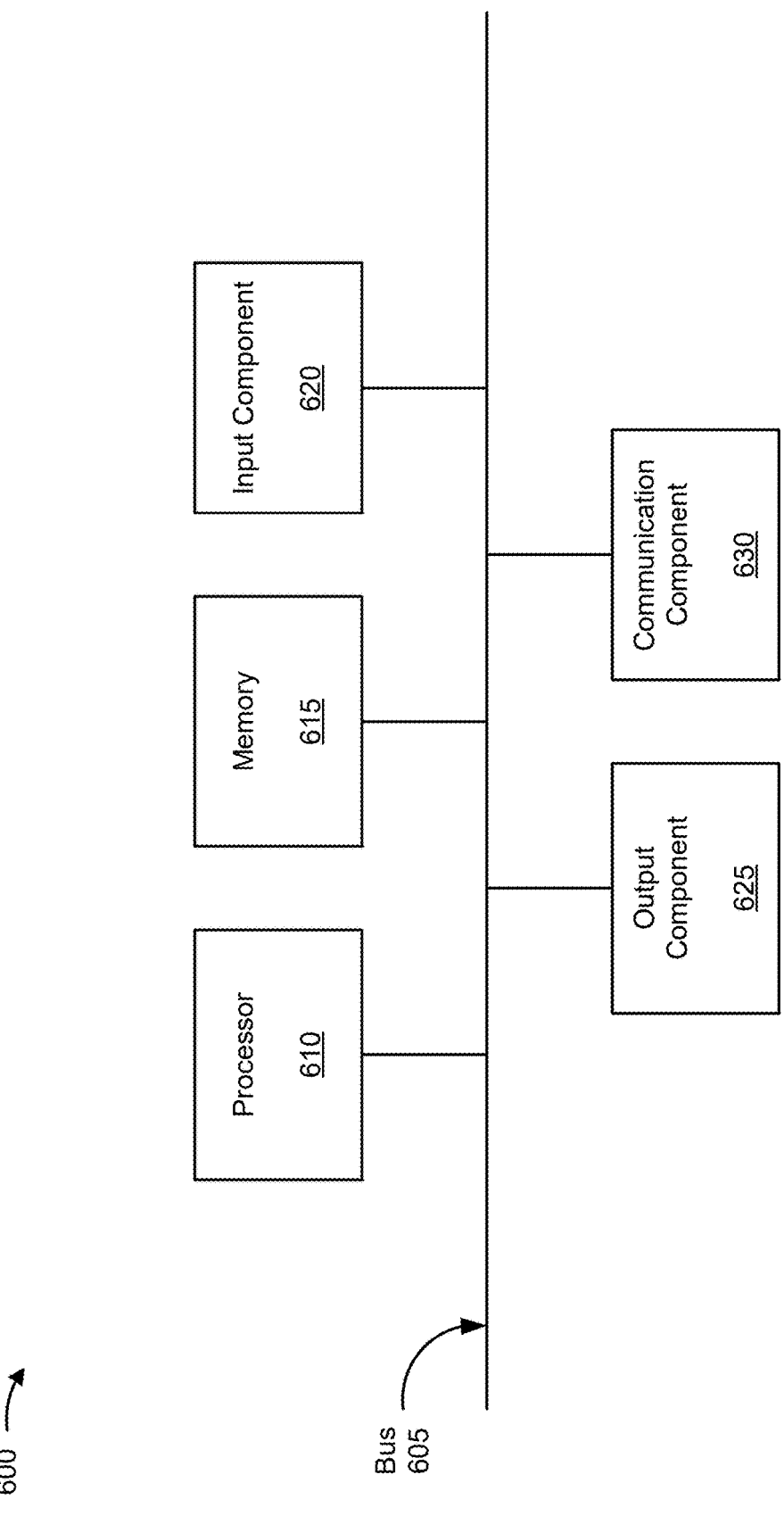
FIG. 6 is a diagram illustrating example components of a device, in accordance with the present disclosure.

FIG. 6 is a diagram illustrating example components of a device 600, in accordance with the present disclosure. The device 600 may include or be associated with register retention during a power collapse. As shown in FIG. 6, the device 600 may include a bus 605, a processor 610, a memory 615, an input component 620, an output component 625, and/or a communication component 630.

The bus 605 may include one or more components that enable wired and/or wireless communication among the components of the device 600. The bus 605 may couple together two or more components of FIG. 6, such as via operative coupling, communicative coupling, electronic coupling, and/or electric coupling. For example, the bus 605 may include an electrical connection (e.g., a wire, a trace, and/or a lead) and/or a wireless bus. The processor 610 may include a central processing unit, a graphics processing unit, a microprocessor, a controller, a microcontroller, a digital signal processor, a field-programmable gate array, an application-specific integrated circuit, and/or another type of processing component. The processor 610 may be implemented in hardware, firmware, or a combination of hardware and software. In some aspects, the processor 610 may include one or more processors capable of being programmed to perform one or more operations or processes described elsewhere herein.

The memory 615 may include volatile and/or nonvolatile memory. For example, the memory 615 may include random access memory (RAM), read only memory (ROM), a hard disk drive, and/or another type of memory (e.g., a flash memory, a magnetic memory, and/or an optical memory). The memory 615 may include internal memory (e.g., RAM, ROM, or a hard disk drive) and/or removable memory (e.g., removable via a universal serial bus connection). The memory 615 may be a non-transitory computer-readable medium. The memory 615 may store information, one or more instructions, and/or software (e.g., one or more software applications) related to the operation of the device 600. In some aspects, the memory 615 may include one or more memories that are coupled (e.g., communicatively coupled) to one or more processors (e.g., processor 610), such as via the bus 605. Communicative coupling between a processor 610 and a memory 615 may enable the processor 610 to read and/or process information stored in the memory 615 and/or to store information in the memory 615.

The input component 620 may enable the device 600 to receive input, such as user input and/or sensed input. For example, the input component 620 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 625 may enable the device 600 to provide output, such as via a display, a speaker, and/or a light-emitting diode. The communication component 630 may enable the device 600 to communicate with other devices via a wired connection and/or a wireless connection. For example, the communication component 630 may include a receiver, a transmitter, a transceiver, a modem, a network interface card, and/or an antenna.

The device 600 may perform one or more operations or processes described herein. For example, a non-transitory computer-readable medium (e.g., memory 615) may store a set of instructions (e.g., one or more instructions or code) for execution by the processor 610. The processor 610 may execute the set of instructions to perform one or more operations or processes described herein. In some aspects, execution of the set of instructions, by one or more processors 610, causes the one or more processors 610 and/or the device 600 to perform one or more operations or processes described herein. In some aspects, hardwired circuitry may be used instead of or in combination with the instructions to perform one or more operations or processes described herein. Additionally, or alternatively, the processor 610 may be configured to perform one or more operations or processes described herein. Thus, aspects described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

FIG. 7 is a flowchart of an example process 700 associated with register retention during a power collapse, in accordance with the present disclosure. In some implementations, one or more process blocks of FIG. 7 are performed by a device (e.g., an SoC). Additionally, or alternatively, one or more process blocks of FIG. 7 may be performed by one or more components of device 600, such as processor 610, memory 612, input component 620, output component 625, and/or communication component 630.

As shown in FIG. 7, process 700 may include identifying, by the device, a register associated with the device (block 710). For example, the device may identify a register associated with the device, as described above.

As further shown in FIG. 7, process 700 may include identifying, by the device and based at least in part on a formal based register retention analysis, that the register is to be retained during a power collapse associated with the device (block 720). For example, the device may identify, based at least in part on a formal based register retention analysis, that the register is to be retained during a power collapse associated with the device, as described above.

As further shown in FIG. 7, process 700 may include generating, by the device, a register retention list that includes the register (block 730). For example, the device may generate a register retention list that includes the register.

As further shown in FIG. 7, process 700 may include performing, by the device and after the power collapse, a hardware functional reset based at least in part on the register retention list (block 740). For example, the device may perform, after the power collapse, a hardware functional reset based at least in part on the register retention list.

Process 700 may include additional implementations, such as any single implementation or any combination of implementations described below and/or in connection with one or more other processes described elsewhere herein.

In a first implementation, process 700 includes identifying, by the device, a first value associated with the register, wherein the first value is associated with an initial hardware reset value of the register; identifying, by the device, a second value associated with the register, wherein the second value is associated with a value of the register immediately prior to the power collapse; and determining, by the device, that the register is to not be retained based at least in part on the first value corresponding to the second value, wherein the register is excluded from the register retention list.

In a second implementation, alone or in combination with the first implementation, process 700 includes identifying, by the device, a third value associated with the register, wherein the third value is associated with a value of the register upon a power collapse exit, wherein the register may be associated with mission mode activity without a software configuration sequence based at least in part on the second value corresponding to the third value.

In a third implementation, alone or in combination with one or more of the first and second implementations, process 700 includes identifying, by the device, a first value associated with the register, wherein the first value is associated with an initial hardware reset value of the register; identifying, by the device, a second value associated with the register, wherein the second value is associated with a value of the register immediately prior to the power collapse; and determining, by the device, that the register is to be retained based at least in part on the first value being different from the second value, wherein the register is included in the register retention list.

In a fourth implementation, alone or in combination with one or more of the first through third implementations, the formal based register retention analysis is based at least in part on one an RTL design, initial design constraints, and a retention analysis property.

In a fifth implementation, alone or in combination with one or more of the first through fourth implementations, the initial design constraints are associated with a minimal set of design constraints, and additional design constraints are potentially added to identify additional registers that are not to be retained.

In a sixth implementation, alone or in combination with one or more of the first through fifth implementations, the register is a non-CSR.

In a seventh implementation, alone or in combination with one or more of the first through sixth implementations, the register is included in the register retention list, and the register is not reset during the hardware functional reset based at least in part on the register being included in the register retention list.

In an eighth implementation, alone or in combination with one or more of the first through seventh implementations, the register retention list is associated with a UPF.

In a nineth implementation, alone or in combination with one or more of the first through eighth implementations, the device is an SoC.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method, comprising: identifying, by a device, a register associated with the device; identifying, by the device and based at least in part on a formal based register retention analysis, that the register is to be retained during a power collapse associated with the device; generating, by the device, a register retention list that includes the register; and performing, by the device and after the power collapse, a hardware functional reset based at least in part on the register retention list.

Aspect 2: The method of Aspect 1, wherein identifying whether the register is to be retained comprises: identifying, by the device, a first value associated with the register, wherein the first value is associated with an initial hardware reset value of the register; identifying, by the device, a second value associated with the register, wherein the second value is associated with a value of the register immediately prior to the power collapse; and determining, by the device, that the register is to not be retained based at least in part on the first value corresponding to the second value, wherein the register is excluded from the register retention list.

Aspect 3: The method of Aspect 1, further comprising: identifying, by the device, a third value associated with the register, wherein the third value is associated with a value of the register upon a power collapse exit, wherein the register may be associated with mission mode activity without a software configuration sequence based at least in part on the second value corresponding to the third value.

Aspect 4: The method of any of Aspects 1-3, wherein identifying whether the register is to be retained comprises: identifying, by the device, a first value associated with the register, wherein the first value is associated with an initial hardware reset value of the register; identifying, by the device, a second value associated with the register, wherein the second value is associated with a value of the register immediately prior to the power collapse; and determining, by the device, that the register is to be retained based at least in part on the first value being different from the second value, wherein the register is included in the register retention list.

Aspect 5: The method of any of Aspects 1-4, wherein: the formal based register retention analysis is based at least in part on: a register transfer level (RTL) design, initial design constraints, and a retention analysis property; and the initial design constraints are associated with a minimal set of design constraints, and additional design constraints are potentially added to identify additional registers that are not to be retained.

Aspect 6: The method of any of Aspects 1-5, wherein the register is a non-control and non-status register (non-CSR).

Aspect 7: The method of any of Aspects 1-6, wherein the register is included in the register retention list, and the register is not reset during the hardware functional reset based at least in part on the register being included in the register retention list.

Aspect 8: The method of any of Aspects 1-7, wherein the register retention list is associated with a unified power format (UPF).

Aspect 9: The method of any of Aspects 1-8, wherein the device is a system on a chip (SoC).

Aspect 10: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-19.

Aspect 11: An apparatus at a device, the apparatus comprising one or more memories and one or more processors coupled to the one or more memories, the one or more processors configured to cause the device to perform the method of one or more of Aspects 1-10.

Aspect 12: An apparatus comprising at least one means for performing the method of one or more of Aspects 1-10.

Aspect 13: A non-transitory computer-readable medium storing code, the code comprising instructions executable by one or more processors to perform the method of one or more of Aspects 1-10.

Aspect 14: A non-transitory computer-readable medium storing a set of instructions, the set of instructions comprising one or more instructions that, when executed by one or more processors of a device, cause the device to perform the method of one or more of Aspects 1-10.

Aspect 15: A device comprising a processing system that includes one or more processors and one or more memories coupled with the one or more processors, the processing system configured to cause the device to perform the method of one or more of Aspects 1-10.

Aspect 16: An apparatus at a device, the apparatus comprising one or more memories and one or more processors coupled to the one or more memories, the one or more processors individually or collectively configured to cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:

one or more antennas; and a processing system that includes one or more processors and one or more memories that store code and are coupled with the one or more processors, the processing system configured to cause the device to:

identify a register associated with the device;

identify, based at least in part on a formal based register retention analysis, that the register is to be retained during a power collapse associated with the device, wherein the formal based register retention analysis is based at least in part on one or more of a register transfer level (RTL) design, initial design constraints, or a retention analysis property, and wherein the initial design constraints are associated with a minimal set of design constraints, and additional design constraints are potentially added to identify additional registers that are not to be retained;

generate a register retention list that includes the register; and perform, after the power collapse, a hardware functional reset based at least in part on the register retention list.

2. The device of claim 1, wherein the processing system, to identify whether the register is to be retained, is configured to cause the device to:

identify a first value associated with the register, wherein the first value is associated with an initial hardware reset value of the register;

identify a second value associated with the register, wherein the second value is associated with a value of the register immediately prior to the power collapse; and determine that the register is to not be retained based at least in part on the first value corresponding to the second value, wherein the register is excluded from the register retention list.

3. The device of claim 2, wherein the processing system is further configured to cause the device to:

identify a third value associated with the register, wherein the third value is associated with a value of the register upon a power collapse exit, wherein the register may be associated with mission mode activity without a software configuration sequence based at least in part on the second value corresponding to the third value.

4. The device of claim 1, wherein the processing system, to identify whether the register is to be retained, is configured to cause the device to:

identify a first value associated with the register, wherein the first value is associated with an initial hardware reset value of the register;

identify a second value associated with the register, wherein the second value is associated with a value of the register immediately prior to the power collapse; and determine that the register is to be retained based at least in part on the first value being different from the second value, wherein the register is included in the register retention list.

5. The device of claim 1, wherein the register is a non-control and non-status register (non-CSR).

6. The device of claim 1, wherein the register is included in the register retention list, and the register is not reset during the hardware functional reset based at least in part on the register being included in the register retention list.

7. The device of claim 1, wherein the register retention list is associated with a unified power format (UPF).

8. The device of claim 1, wherein the device is a system on a chip (SoC).

9. A method, comprising:

identifying, by a device, a register associated with the device;

identifying, by the device and based at least in part on a formal based register retention analysis, that the register is to be retained during a power collapse associated with the device, wherein the formal based register retention analysis is based at least in part on one or more of a register transfer level (RTL) design, initial design constraints, or a retention analysis property; and wherein the initial design constraints are associated with a minimal set of design constraints, and additional design constraints are potentially added to identify additional registers that are not to be retained;

generating, by the device, a register retention list that includes the register; and performing, by the device and after the power collapse, a hardware functional reset based at least in part on the register retention list.

10. The method of claim 9, wherein identifying whether the register is to be retained comprises:

identifying, by the device, a first value associated with the register, wherein the first value is associated with an initial hardware reset value of the register;

identifying, by the device, a second value associated with the register, wherein the second value is associated with a value of the register immediately prior to the power collapse; and determining, by the device, that the register is to be not retained based at least in part on the first value corresponding to the second value, wherein the register is excluded from the register retention list.

11. The method of claim 10, further comprising:

identifying, by the device, a third value associated with the register, wherein the third value is associated with a value of the register upon a power collapse exit, wherein the register may be associated with mission mode activity without a software configuration sequence based at least in part on the second value corresponding to the third value.

12. The method of claim 9, wherein identifying whether the register is to be retained comprises:

identifying, by the device, a first value associated with the register, wherein the first value is associated with an initial hardware reset value of the register;

identifying, by the device, a second value associated with the register, wherein the second value is associated with a value of the register immediately prior to the power collapse; and determining, by the device, that the register is to be retained based at least in part on the first value being different from the second value, wherein the register is included in the register retention list.

13. The method of claim 9, wherein the register is a non-control and non-status register (non-CSR).

14. The method of claim 9, wherein the register is included in the register retention list, and the register is not reset during the hardware functional reset based at least in part on the register being included in the register retention list.

15. The method of claim 9, wherein the register retention list is associated with a unified power format (UPF).

16. The method of claim 9, wherein the device is a system on a chip (SoC).

17. A non-transitory computer-readable medium storing a set of instructions, the set of instructions comprising:

one or more instructions that, when executed by one or more processors of a device, cause the device to:

identify a register associated with the device;

identify, based at least in part on a formal based register retention analysis, that the register is to be retained during a power collapse associated with the device, wherein the formal based register retention analysis is based at least in part on one or more of a register transfer level (RTL) design, initial design constraints, or a retention analysis property; and wherein the initial design constraints are associated with a minimal set of design constraints, and additional design constraints are potentially added to identify additional registers that are not to be retained;

generate a register retention list that includes the register; and perform, after the power collapse, a hardware functional reset based at least in part on the register retention list.

18. The non-transitory computer-readable medium of claim 17, wherein the one or more instructions, to cause the device to identify whether the register is to be retained, cause the device to:

identify a first value associated with the register, wherein the first value is associated with an initial hardware reset value of the register;

identify a second value associated with the register, wherein the second value is associated with a value of the register immediately prior to the power collapse; and determine that the register is to not be retained based at least in part on the first value corresponding to the second value, wherein the register is excluded from the register retention list.

19. The non-transitory computer-readable medium of claim 18, wherein the one or more instructions further cause the device to:

identify a third value associated with the register, wherein the third value is associated with a value of the register upon a power collapse exit, wherein the register may be associated with mission mode activity without a software configuration sequence based at least in part on the second value corresponding to the third value.

20. The non-transitory computer-readable medium of claim 17, wherein the one or more instructions, to cause the device to identify whether the register is to be retained, cause the device to:

identify a first value associated with the register, wherein the first value is associated with an initial hardware reset value of the register;

identify a second value associated with the register, wherein the second value is associated with a value of the register immediately prior to the power collapse; and determine that the register is to be retained based at least in part on the first value being different from the second value, wherein the register is included in the register retention list.

* * * * *